(12) United States Patent
Field et al.

(10) Patent No.: US 9,509,942 B1
(45) Date of Patent: Nov. 29, 2016

(54) AUTOMATIC CONTENT CATEGORIZING SYSTEM AND METHOD

(71) Applicant: Picaboo Corporation, Redwood City, CA (US)

(72) Inventors: Howard Field, Redwood City, CA (US); Kevin McCurdy, Redwood City, CA (US)

(73) Assignee: PICABOO CORPORATION, Hanover, NH (US)

( * ) Notice: Subject to any disclaimer, the term of this patent is extended or adjusted under 35 U.S.C. 154(b) by 0 days.

(21) Appl. No.: 15/047,564

(22) Filed: Feb. 18, 2016

Related U.S. Application Data (60) Provisional application No. 62/292,669, filed on Feb. 8, 2016.

(51) Int. Cl.
*H04N 5/765* (2006.01)
*G06F 17/30* (2006.01)

(52) U.S. Cl.
CPC ........ *H04N 5/765* (2013.01); *G06F 17/30265* (2013.01); *G06F 17/30268* (2013.01)

(58) Field of Classification Search
CPC ..................... H04N 5/765; H04N 2201/3226; G06F 17/30265; G06F 17/30268
See application file for complete search history.

(56) References Cited

U.S. PATENT DOCUMENTS

| | | | |
|---|---|---|---|
| 5,633,678 A * | 5/1997 | Parulski | G06F 17/30265 348/231.5 |
| 2004/0201702 A1* | 10/2004 | White | H04N 1/2166 348/207.99 |
| 2010/0134662 A1* | 6/2010 | Bub | H04N 1/195 348/266 |

* cited by examiner

*Primary Examiner* — Ahmed A Berhan
(74) *Attorney, Agent, or Firm* — DLA Piper LLP (US)

(57) ABSTRACT

An automatic content categorization system and method are provided.

28 Claims, 6 Drawing Sheets

AUTOMATIC CONTENT CATEGORIZING SYSTEM AND METHOD

PRIORITY CLAIMS/RELATED APPLICATIONS

This application claims the benefit under 35 USC 119(e) and 35 USC 120 to U.S. Provisional Patent Application Ser. No. 62/292,669, filed on Feb. 8, 2016 and entitled "Automatic Content Categorization System and Method", the entirety of which is incorporated herein by reference.

FIELD

The disclosure relates generally to a system and method for automatically categorizing digital content.

BACKGROUND

Devices that are able to capture content, such as an image, a video, voice recordings, etc. are well known. These device may include smartphone devices, such as Apple® iPhone® line of products as well as the Android® operating system based devices, as well as cameras and other devices that have the capability to capture a piece of content. Most of these devices allow the user to capture the content and store it on the device or at a remote site. The user must then spend the time and effort to sort, organize or categorize the captured content after the content has been captured. Thus, none of these devices allow the user to easily and automatically categorize the content as it is being captured using the device.

DETAILED DESCRIPTION OF ONE OR MORE EMBODIMENTS

The disclosure is particularly applicable to a smart phone device, such as an Apple® iPhone® or an Android® operating system based device, that has the automatic content categorization and it is in this context that the disclosure will be described. It will be appreciated, however, that the system and method has greater utility since it can be implemented using various different hardware and software different than those disclosed below and the content categorization device may be a tablet computer, a consumer device like a camera and any other device in which it is desirable to be able to automatically categorize content.

Figure 1:
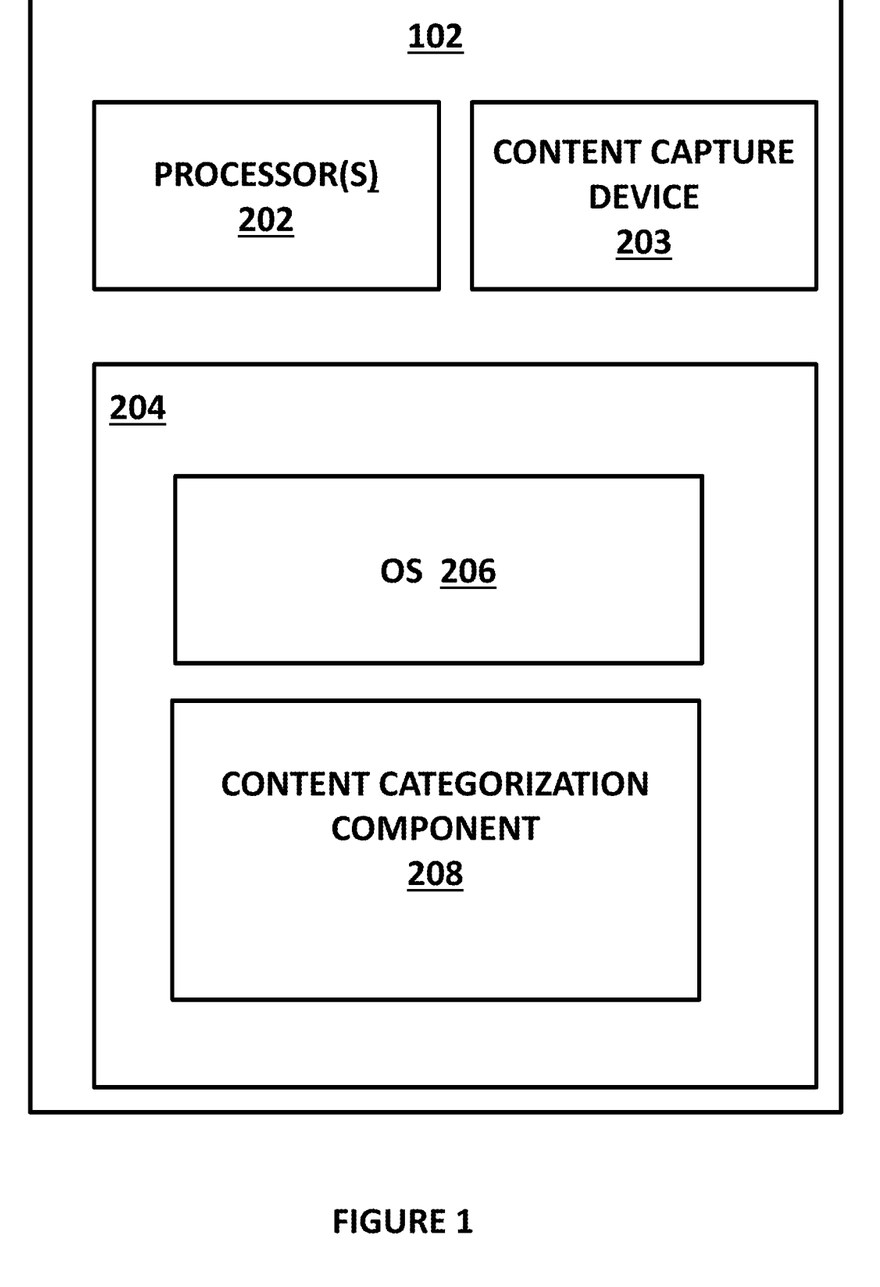
FIG. 1 illustrates a computing device that may include an automatic content categorization component.

FIG. 1 illustrates a computing device 102 that may include an automatic content categorization component. Each computing device 102 may include one or more processing units 202, one or more content capturing devices 203, such as a camera, a video camera, a microphone or other devices that can capture a piece of content, one or more persistent storage devices (that may be various types of electronic/optical/magnetic, flash memory, etc.), a memory 204 and an optional display. The computing device may be for example, a camera, a video camera, a smartphone device, such as an Apple® iPhone® or an Android® operating system based device, a tablet computer device or any other device that is capable of capturing content. The one or more processors 202 control the overall operation and functioning of the computing device and the memory 204 may contain applications that have been read into the memory (or are already resident in the memory) and then may be executed by the one or more processing units. For example, the memory may have an operating system 206 that controls the overall operation and functioning of the computing device as is well known. Each computing device 102 may further comprise a content categorization component 208 that automatically categorizes content captured by the content capturing device 203 as the content is captured as described below using one or more different shutter elements. In one embodiment, the content categorization component 208 may be piece of hardware that may be connected to/couple to the computing device to provide the automatic content categorization as described below. In another embodiment shown in FIG. 1, the content categorization component 208 may be resident in the memory 204 and may be implemented as a plurality of lines of computer code that can be executed by the one or more processing units of the computing device 102 so that the processor(s) are configured to perform the processes of the automatic content categorization described below. The lines of computer code that implement the automatic content categorization may be a component within the computing device or it may be implemented as separate software component or application that may be downloaded to the computing device. For example, in one embodiment, the content categorization component 208 may be an application that may be downloaded to the computing device 102 and may then use the various resources of the computing device 102 to provide the automatic content categorization capability.

The computing device 102 also may store a plurality of pieces of content of the user captured by the user and the plurality of pieces of content of the user may each have metadata associated with them. Using the content categorization component 208, the pieces of content stored on the computing device (or at a remote location) may be automatically categorized based on a shutter or other content capture element used to capture the content as described below. As an example, the content may be categorized by an event (birthday, vacation), a time period, a topic (construction, art), and the like. The computing device 102 may store each of the pieces of content categorized in a particular category into a folder, for example, directly from the shutter of other capture element. Thus, for example, the memory of the computing device may have one or more storage locations wherein each storage location stores the pieces of content for a particular content category so that the pieces of content for each content category are separated and can be accessed separately. In other embodiments, the different storage locations for each content category may be different records in a database or different memory addresses. The disclosed system and method may utilize any method to store the different content category storage locations.

Figure 2:
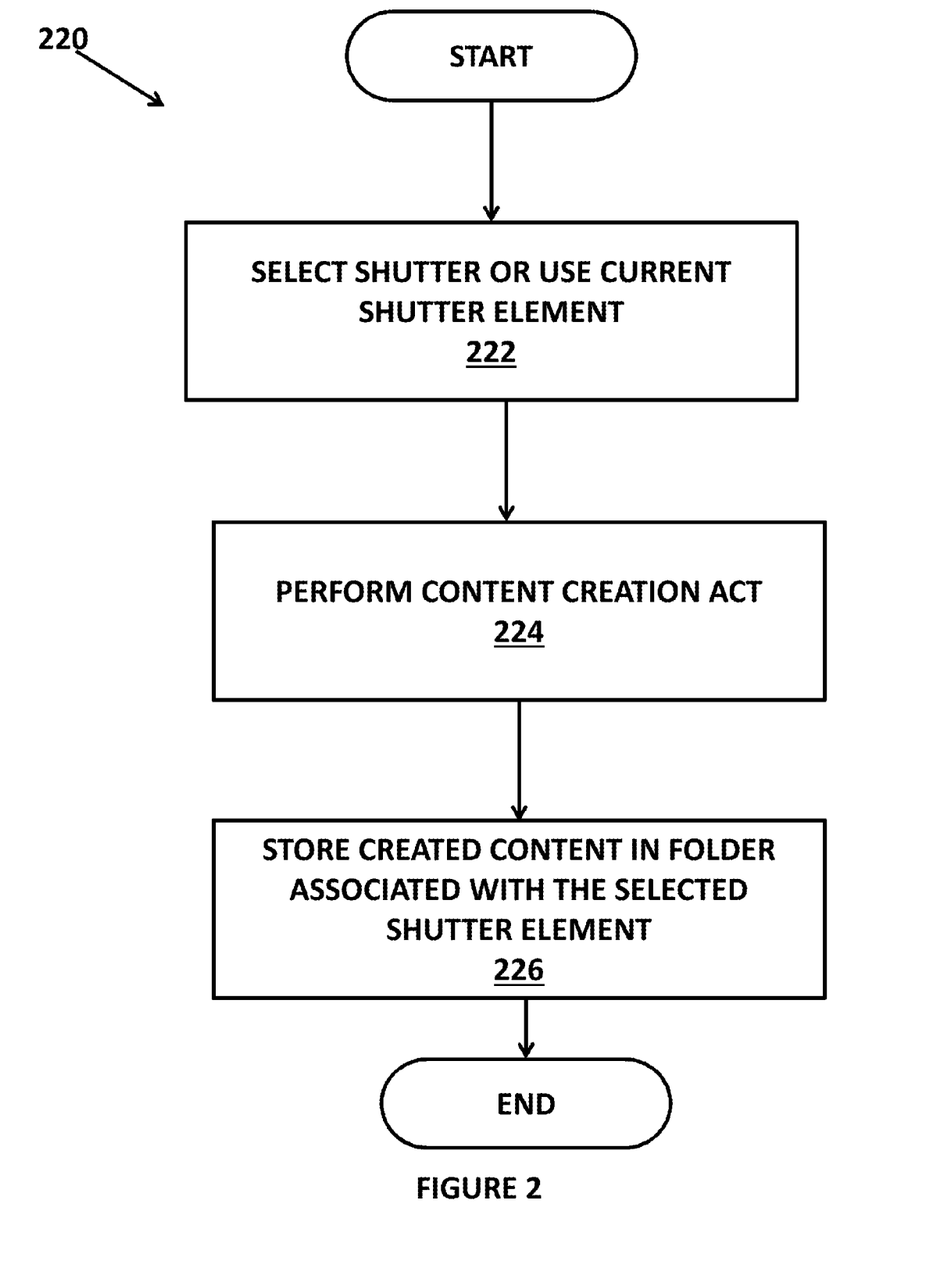
FIG. 2 illustrates a method for automatic content categorization.

FIG. 2 illustrates a method 220 for automatic content categorization. The method 220 may be performed by the content categorization component 208 and the resources of the computing device 102. When the content categorization component 208 is implemented as the application, it may be already resident on the computing device 102 or downloaded onto the computing device 102. When the user wants to capture a piece of content, a shutter element may be selected or the current shutter element may be used (222). Each shutter element may be associated with a particular categorization of content, such as a vacation, an event like a birthday or business meeting/event or birth of a child or a period of time. Thus, any pieces of content taken with a particular shutter element are categorized into the category associated with the shutter element. A content creation action (224) may then be performed to capture a piece of content using the particular shutter element. It should be noted that the shutter element can be changed after each piece of content is captured so that pieces of content for multiple different categories may be captured and categorized. The content being captured may be an image, a video, an audio file or any other piece of digital content. Once the content is captured, the content may be stored in a storage location (226) associated with the particular shutter element that was used to capture the content. The storage location, such as a folder, divides the captured content into the category of the particular shutter element.

Figure 3A:
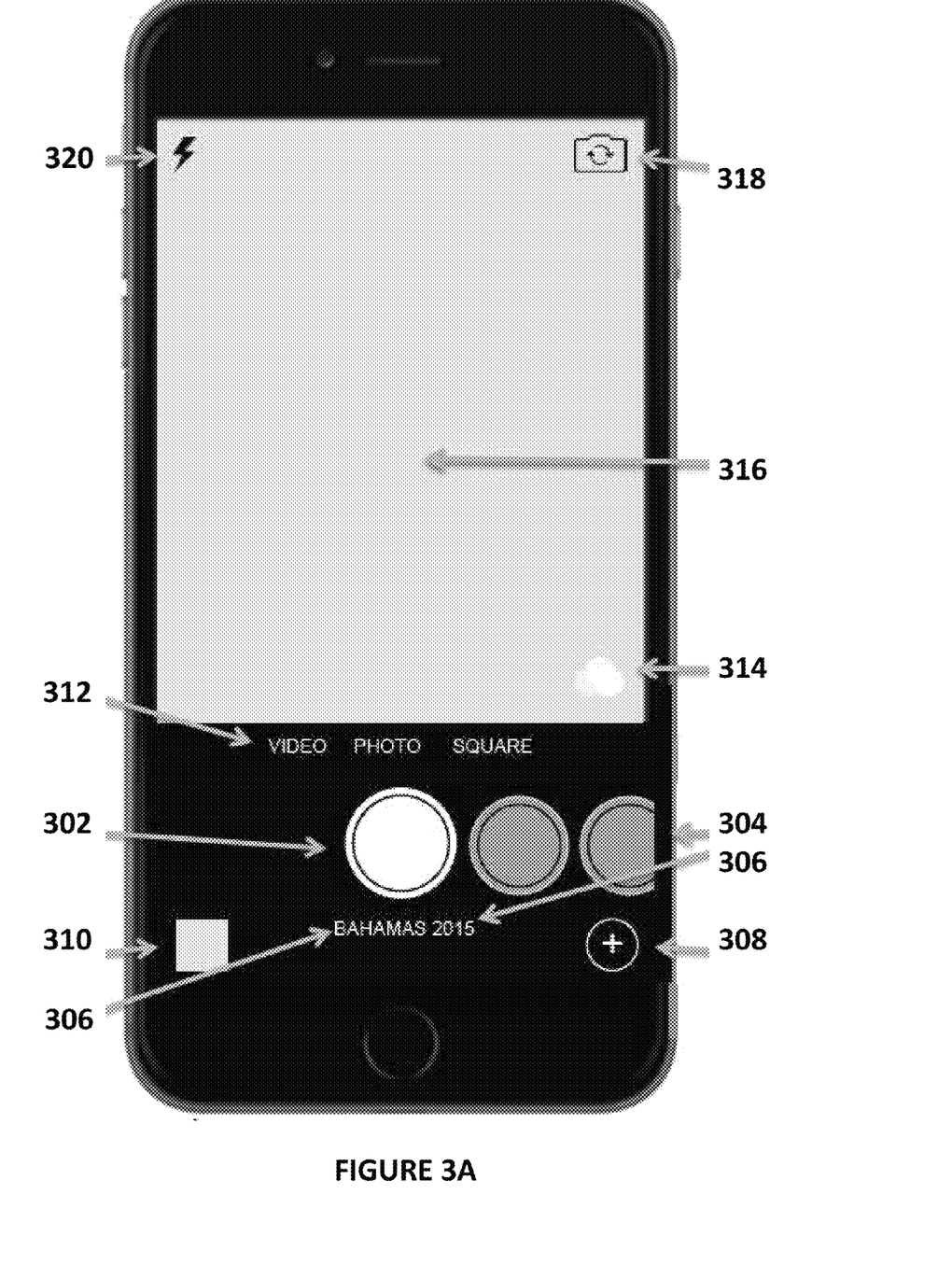
FIG. 3A illustrates an example of a first implementation of an automatic content categorization component implemented in an application running on a mobile device.

FIG. 3A illustrates an example of an implementation of an automatic content categorization component implemented in an application running on the computing device 102. The application may be used for capturing a plurality of pieces of content using the resources of the computing device 102. The application may include an active shutter element 302 (that may be a user interface element that is selected by the user by touching the screen on a touch screen based computing device or by other means) that, when tapped, a piece of content may be taken and stored based on a categorization of the shutter element. For example, in one implementation, the piece of content may be stored in an iOS® photos album in an Apple® iPhone® computing device.

Figure 4:
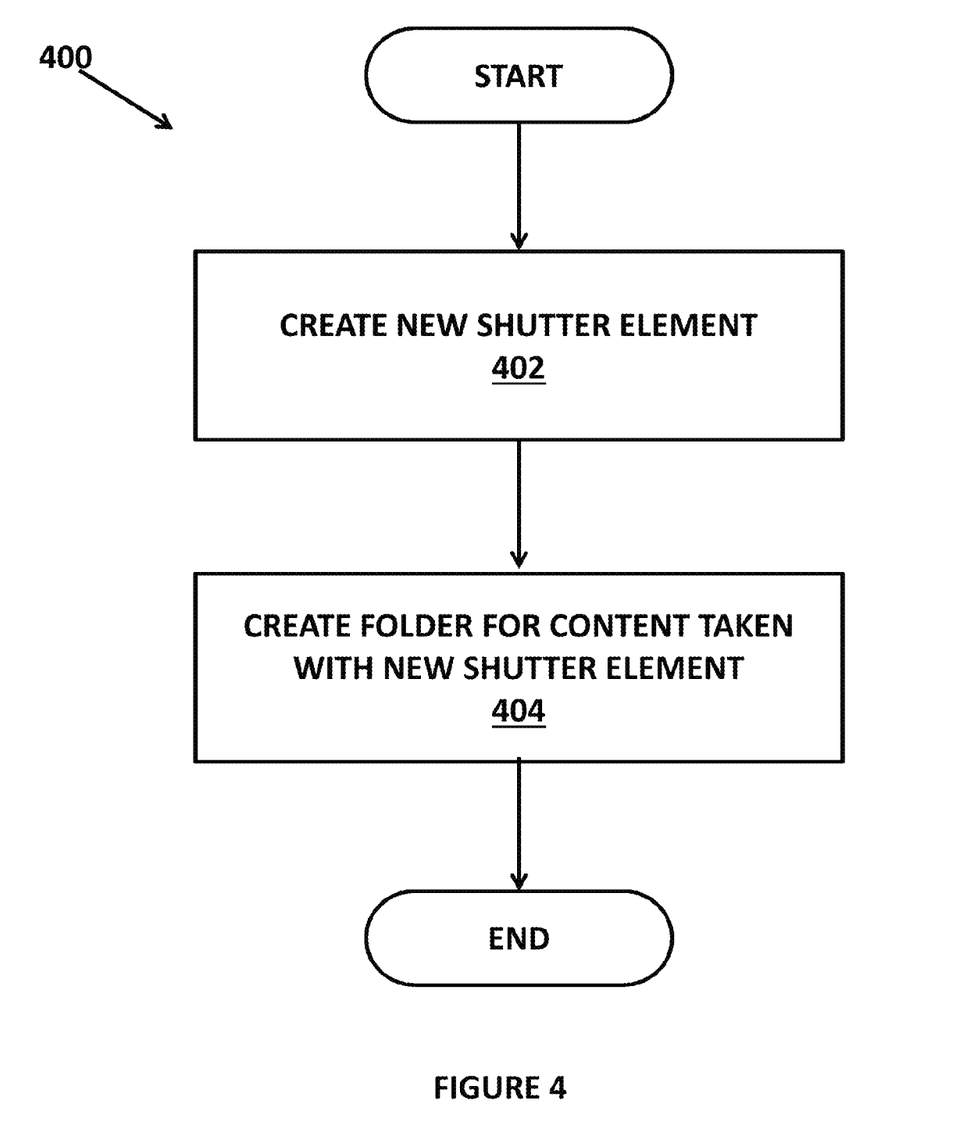
FIG. 4 illustrates a method for creating a new content categorization category.

In the automatic content categorization component, the shutter element 302 may include a plurality of shutter elements (that appear as user interface elements on the computing device) and each shutter element may correspond to a different content categorization. For example, one shutter element may be a vacation shutter that categorizes content taken by pressing that shutter element into a vacation categorization while another shutter element may be a Hawaii shutter that categorizes content taken by pressing that shutter element into a Hawaii categorization and another element is a school event shutter that categorizes content taken by pressing that shutter element into a kid's school categorization. In one embodiment on a touchscreen based device, a user may swipe 304 to select each of the different shutter elements and the user interface may provide a carrousel action to move between the different shutter elements. The currently selected or active shutter element may display a categorization label 306 with a name of the categorization that is selected. In an Apple® iPhone® embodiment, the categorization may be an album name and tapping on the album name shows an action menu allowing the user to remove, rename or cancel the particular categorization. The application may further comprise an add new shutter element 308 that allows the user to add a new shutter (as shown in FIG. 4) and categorization (402) so that a new categorization storage (404), such as a photo album in an Apple® iPhone®, is generated, such as in iOS® Photos for an Apple® iPhone®, for content captured using the new shutter element.

The application may also include a view photos element 310 so that the user can view the content in the categorization, such as an album on an Apple® iPhone® device and a camera type element 312 so that the user can select the type of content creation, such as a photo, video, square and the like by swiping to change the type of content creation for example on an Apple® iPhone® device. The application may also include a filters element 314 to select different content filters, a viewer element 316 to view the content and zoom in/out by, for example, pinching on an Apple® iPhone® device and a camera front/back element 318 that allows the user to switch between a front camera and back camera of the device and a flash element 320 that allows the user to turn a flash on/off or in automatic mode.

The content categorization component 208, implemented using the application in FIG. 3, thus allows the user to organize/categorize content using the one or more shutter elements. Each shutter element may be associated with a different content categorization such as a vacation, a family piece of content, a business related piece of content, an art piece of content and the like. When a new shutter is added, the content creation application may automatically create a storage location, such as a folder, for the new content categorization.

The content categorization component 208 may also allow two or more users of the content categorization component 208 to share shutter elements between the computing devices 102. For example, two users may share a "Hawaii vacation" shutter element between their devices so that all of the content taken by both users using the "Hawaii vacation" shutter element will be stored in the "Hawaii vacation" categorization on each device. Then, the content in the categorization on each device may be merged and used for various purposes.

Figure 3B:
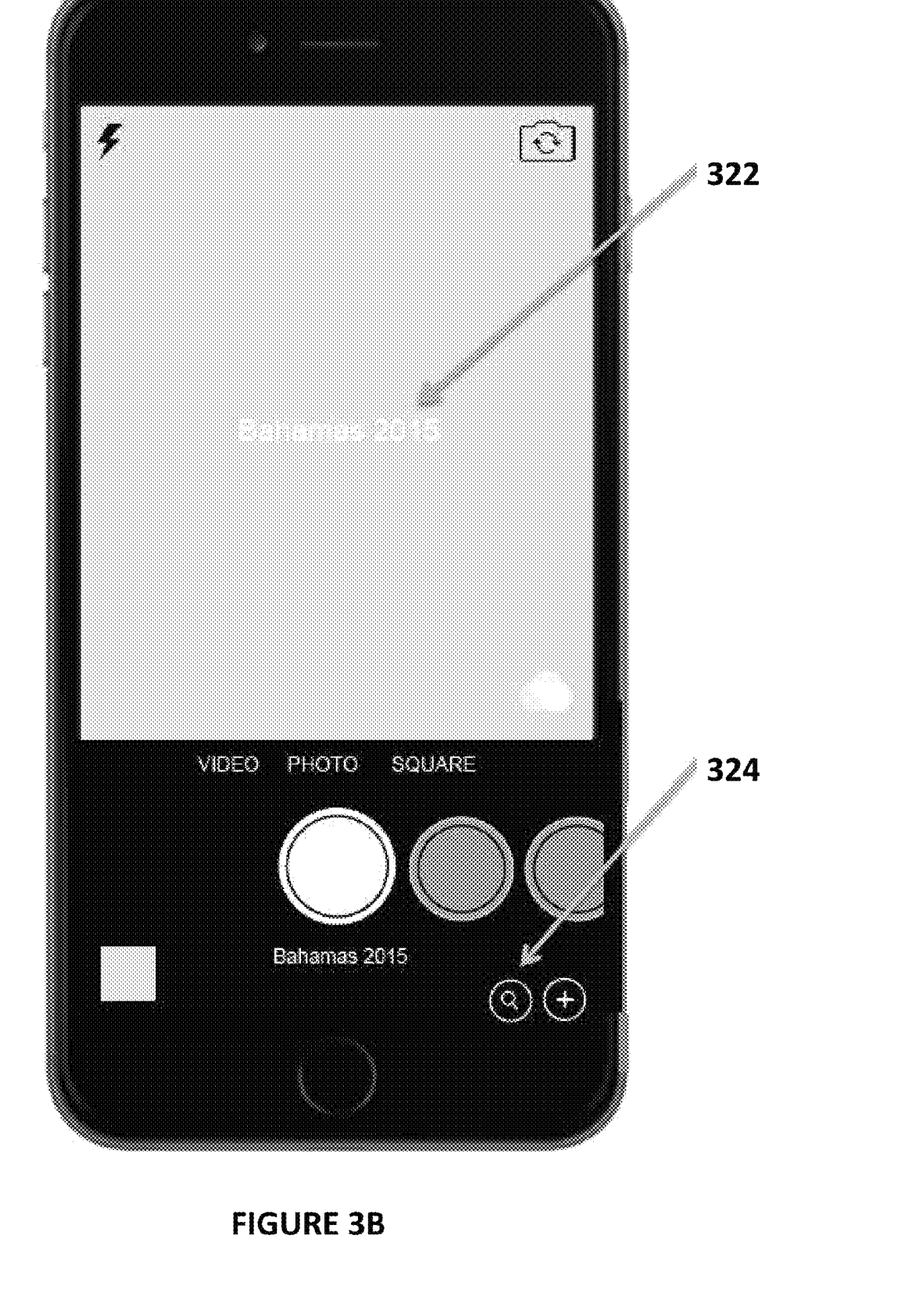
FIG. 3B illustrates an example of a second implementation of an automatic content categorization component implemented in an application running on a mobile device.

FIG. 3B illustrates an example of a second implementation of an automatic content categorization component implemented in an application running on a mobile device 102. This implementation has the same elements as shown in FIG. 3A and the description of those elements will not be repeated here. In addition, this implementation may have an album name display element 322 so that, as a user swipes through the shutter elements, the album name for the particular content categorization for the particular shutter element is displayed to the user. The application may use a slide-in from the right/slide out to the left user interface effect and the text may fade out after a predetermined amount of time, such as 500 milliseconds.

This implementation of the application may further comprise search element 324 that provides search functionality. When the search element 324 is tapped (when the application is implemented on a computing device with a touchscreen) a search box appears and the default keyboard becomes active. As the user types characters into the search box, the search element 324 may display a list of matching albums as soon as the user begins typing. The user may then select an album from the search box. The search element 324 may also allow the user to perform a search without selecting an album and then close the search box.

Figure 5:
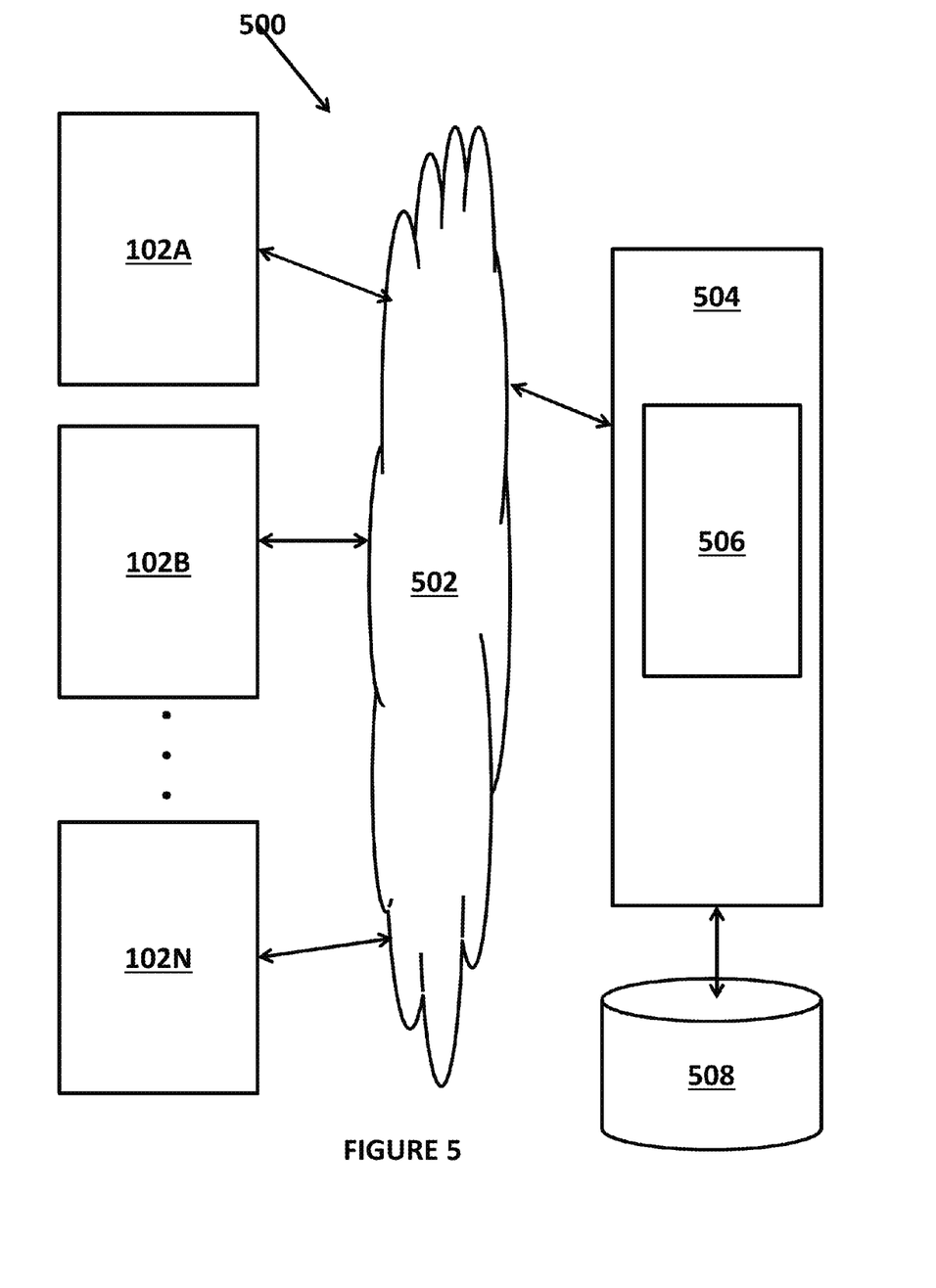
FIG. 5 illustrates a content system that may utilize the device with automatic content categorization.

FIG. 5 illustrates a content system 500 that may utilize one or more devices 102 with the automatic content categorization component 208. The system may include the one or more computing devices 102 that are each able to access and interact with a content component 506 over a communications link 502 (wired or wireless). The content component 506 may be hosted on a backend system 504 that may be one or more server computers or one or more cloud computing resources. The system 500 may further comprise a storage device 508 that stores various information and data of the system including user data and the content of each user that is captured using the automatic content categorization component 208. Thus, the storage device 508 may have different storage locations that store the one or more pieces of content for each categorization of each user. The content component 506 may utilize the automatically categorized content for various different purposes. For example, the content component 506 may generate a book of content based on the automatically categorized content, such as a book of content about a vacation or an event. The content component 506 may also use the categorized content for any other purpose. In some embodiments, the content component 506 may perform part of the sharing of the shutter elements between users as described above.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method, comprising:
providing a plurality of electronic shutter elements on a device having a content capturing device that captures content, wherein each of the plurality of electronic shutter elements has an associated content category and categorizes, using the content category, the content captured using the content capturing device;
creating a new electronic shutter element with a content category wherein the new electronic shutter element categorizes, using the content category, the content captured using the content capturing device;
categorizing a captured piece of content using the content category associated with an electronic shutter element that is active when the piece of content is captured using the content capturing device; and
wherein the electronic shutter element is active based on a user selection made by touching an image of the active electronic shutter element displayed in a user interface displayed on a touchscreen of the device.

2. The method of claim 1 further comprising capturing, using the content capturing device, the piece of content using the active electronic shutter element.

3. The method of claim 1 further comprising selecting the active electronic shutter element from the plurality of shutter elements before capturing the piece of content.

4. The method of claim 3 further comprising selecting a different electronic shutter element from the plurality of electronic shutter elements before capturing another piece of content so that the other piece of content is categorized differently based on the content category associated with the different electronic shutter element.

5. The method of claim 4, wherein categorizing the piece of content further comprises storing the other piece of content in a storage location associated with the content category of the different electronic shutter element.

6. The method of claim 1, wherein categorizing the piece of content further comprises storing the captured piece of content in a storage location associated with the content category of the electronic shutter element.

7. The method of claim 6, wherein storing the captured piece of content further comprises storing the captured piece of content in a folder associated with the content category of the electronic shutter element.

8. The method of claim 6, wherein storing the captured piece of content further comprises storing the captured piece of content in an album associated with the content category of the electronic shutter element.

9. The method of claim 1 further comprising displaying the content category of the active electronic shutter element.

10. The method of claim 1, wherein the piece of content is one of an image, a video and an audio.

11. The method of claim 1 further comprising sharing any one of the plurality of electronic shutter elements with another device that has a content capturing device so that each devices captures content using the content capturing device and the shared electronic shutter element so that the captured content on the devices are categorized based on the shared electronic shutter element.

12. A non-transitory computer readable medium, comprising:
a plurality of lines of code executed by a processor that use, from a plurality of electronic shutter elements associated with the application that is resident on a device having a content capturing device that captures content, an electronic shutter element, wherein each of the plurality of electronic shutter elements has an associated content category and categorizes, using the content category, the content captured using the content capturing device;

a plurality of lines of code executed by the processor that create a new electronic shutter element with a content category wherein the new electronic shutter element categorizes, using the content category, the content captured using the content capturing device; and a plurality of lines of code executed by the processor that categorize a captured piece of content using the category associated with an electronic shutter element active when the piece of content is captured, wherein the electronic shutter element is active based on a user selection made by touching an image of the active electronic shutter element displayed in a user interface displayed on a touchscreen of the device.

13. The non-transitory computer readable medium of claim 12 further comprising a plurality of lines of code executed by the processor that cause the content capturing device to capture the piece of content using the active electronic shutter element.

14. The non-transitory computer readable medium of claim 12 further comprising a plurality of lines of code executed by the processor that selects the active electronic shutter element from the plurality of electronic shutter elements before capturing the piece of content.

15. The non-transitory computer readable medium of claim 14 further comprising a plurality of lines of code executed by the processor that select a different electronic shutter element from the plurality of shutter elements before capturing another piece of content so that the other piece of content is categorized differently based on the content category associated with the different electronic shutter element.

16. The non-transitory computer readable medium of claim 15 further comprising a plurality of lines of code executed by the processor that store the other piece of content in a storage location associated with the content category of the different electronic shutter element.

17. The non-transitory computer readable medium of claim 12 further comprising a plurality of lines of code executed by the processor that store the captured piece of content in a storage location associated with the content category of the electronic shutter element.

18. The non-transitory computer readable medium of claim 17 further comprising a plurality of lines of code executed by the processor that store the captured piece of content in a folder associated with the content category of the electronic shutter element.

19. The non-transitory computer readable medium of claim 17 further comprising a plurality of lines of code executed by the processor that store the captured piece of content in an album associated with the content category of the electronic shutter element.

20. The non-transitory computer readable medium of claim 12 further comprising a plurality of lines of code executed by the processor that display the content category of the electronic shutter element used to capture the piece of content.

21. The non-transitory computer readable medium of claim 12, wherein the piece of content is one of an image, a video and an audio.

22. The non-transitory computer readable medium of claim 12 further comprising a plurality of lines of code executed by the processor that share any one of the plurality of electronic shutter elements with another device that has a content capturing device so that each devices captures content using the content capturing device and the shared electronic shutter element so that the captured content on the devices are categorized based on the shared electronic shutter element.

23. A device, comprising:
a processor;
a memory connected to the processor;
a touchscreen displaying a user interface;
a content capturing device that captures content;
a content application stored in the memory, the content application having a plurality of lines of computer code that are executed by the processor;
the content application having a plurality of electronic shutter elements and each of the plurality of electronic shutter elements has a content category and categorizes, using the content category, the content captured using the content capturing device;
the content application creating a new electronic shutter element with a content category wherein the new electronic shutter element categorizes, using the content category, the content captured using the content capturing device; and
the content application categorizing a captured piece of content into the content category associated with the electronic shutter element that is active when the piece of content is captured, wherein the electronic shutter element is active based on a user selection made by touching an image of the active electronic shutter element displayed in the user interface displayed on the touchscreen of the device.

24. The device of claim 23, wherein the memory has a separate storage location for the piece of content in each category and the piece of content captured using the active electronic shutter element is stored in the storage location for the content category associated with the active electronic shutter element.

25. The device of claim 24, wherein each storage location is one of a folder and an album.

26. The device of claim 23, wherein the content application allows each of the plurality of electronic shutter elements to be selected before capturing the piece of content.

27. The device of claim 23, wherein the content application further shares any one of the plurality of electronic shutter elements with another device that has a content capturing device so that each devices captures content using the content capturing device and the shared electronic shutter element so that the captured content on the devices are categorized based on the shared electronic shutter element.

28. The device of claim 23, wherein the content application selects the active electronic shutter element from the plurality of electronic shutter elements before capturing the piece of content.

* * * * *